W. BUSHEE.
Trucks for Moving Buildings.

No. 196,289. Patented Oct. 23, 1877.

WITNESSES.
E. A. Hemmenway
Benj. Andrews Jr.

INVENTOR.
William Bushee
by N. C. Lombard
his Attorney

UNITED STATES PATENT OFFICE.

WILLIAM BUSHEE, OF GLOUCESTER, MASSACHUSETTS.

IMPROVEMENT IN TRUCKS FOR MOVING BUILDINGS.

Specification forming part of Letters Patent No. 196,289, dated October 23, 1877; application filed April 9, 1877.

*To all whom it may concern:*

Be it known that I, WILLIAM BUSHEE, of Gloucester, in the county of Essex and State of Massachusetts, have invented a new and useful Improvement in Rolls for Moving Buildings and other heavy weights, of which the following, taken in connection with the accompanying drawings, is a specification.

My invention relates to an improved roll for moving buildings and other heavy weights.

It consists in the combination of a roll mounted in bearings in a horizontal position in a plate or disk having its bearings upon a fixed plate, and adapted to revolve thereon about a vertical axis, and provided with a series of teeth cut in its periphery, which engage with and are acted upon by a screw or worm shaft mounted in suitable bearings on said fixed or secondary plate.

My invention further consists in the combination, in a device for facilitating the moving of buildings or other heavy weights, of a disk or plate adapted to be secured in a fixed position to the under side of a building or other object to be moved; a worm-wheel connected to said fixed plate by an axial bolt or shaft, about which it may be rotated in a horizontal plane; a worm-shaft for imparting such motion; a series of anti-friction balls or rolls interposed between said fixed and rotating plates; and a roll mounted in bearings in said rotating plate in a horizontal position, and adapted to bear upon and roll along the track prepared for the purpose, as will be explained.

Figure 1:
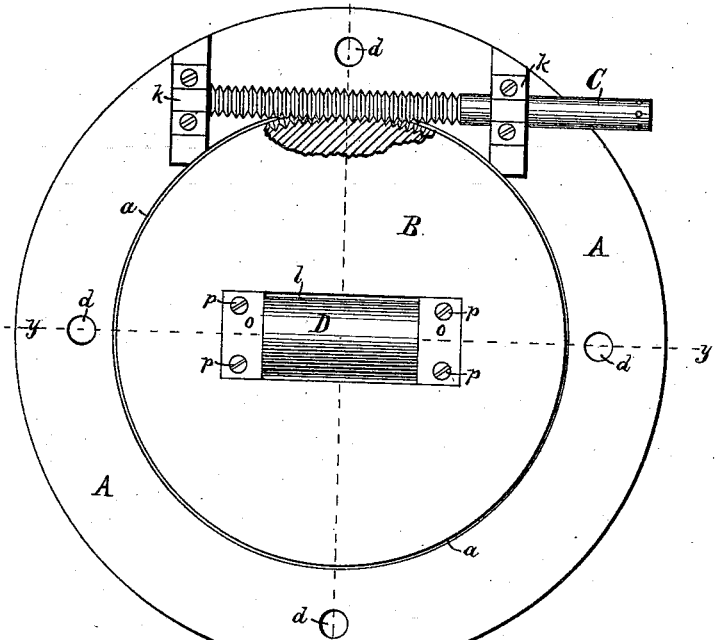
Figure 2:
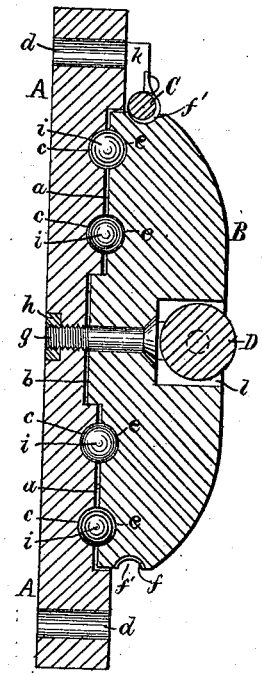
Figure 3:
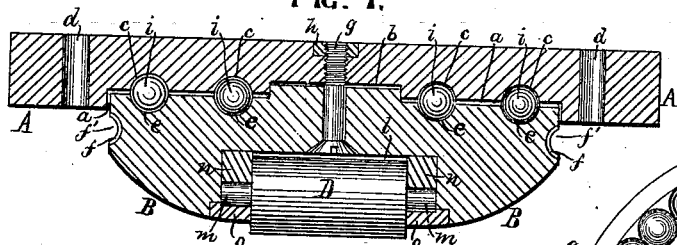
Figure 4:
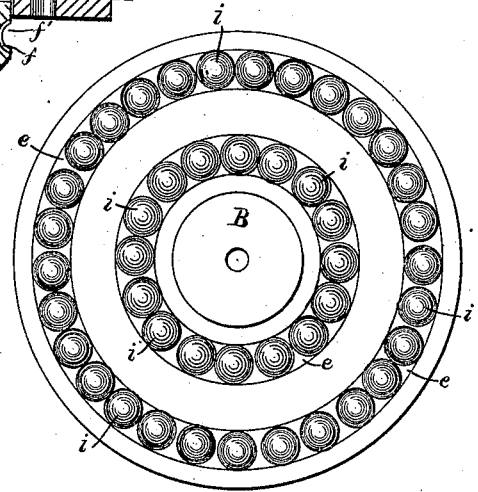

Figure 1 is an inverted plan of my improved device. Fig. 2 is a vertical section on line $x\,x$ on Fig. 1. Fig. 3 is a similar section on line $y\,\bar{y}$ on Fig. 1. Fig. 4 is a plan of the rotary plate, showing anti-friction balls; and Fig. 5 is a partial section on line $y\,y$, Fig. 1, illustrating a modification of the anti-friction device, in which a conical roll is substituted for the ball.

A is a circular plate, to be made, preferably, of cast-iron, made flat upon its upper side, and having formed in its under side the shallow recesses $a$ and $b$, and one or more semicircular annular grooves, $c\,c$, and also provided with bolt-holes $d\,d$, through which and by means of lag-screw bolts, it may be secured firmly to the under side of the sill of a building, in an obvious manner.

B is another circular disk or plate, having its upper surface turned to fit the recesses $a$ and $b$ in the disk A, and having formed therein one or more semicircular annular grooves, $e\,e$, corresponding to $c\,c$ in the disk A, and also having formed around its periphery a female screw, the threads $f$ extending across a groove, $f'$, the bottom of which is in the form of a section of a circle when seen in cross-section, as in Figs. 2 and 3.

Figure 5:
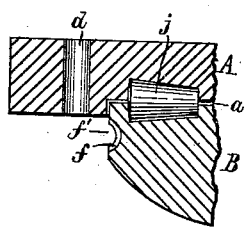

The disk B is secured to the disk A by means of the axial bolt $g$ and nut $h$, and takes its bearing upon the series of anti-friction balls $i\,i$, as seen in Figs. 2 and 3, or upon the anti-friction conical rolls $j$, as seen in Fig. 5.

C is a worm or screw shaft mounted in bearings $k\,k$, formed upon or secured to the disk A, and engaging, by its screw-thread, with the teeth $f$, formed in the edge of the disk B, as shown in Fig. 1.

In the under side of the disk B is formed the recess or chamber $l$, within which is placed the roll D, provided with the journals $m\,m$, fitted to and adapted to revolve in bearings formed in or secured to the disk B, with its periphery projecting a short distance below the lowest part of the disk B, as shown in Figs. 2 and 3.

The bearings for the journals $m\,m$ consist of the removable half-boxes $n\,n$, made preferably of hard composition or tempered steel, and the caps $o\,o$, secured in place by the screws $p\,p$.

In moving buildings and other heavy weights as heretofore practiced, it has been customary to use a series of plain cylinders of wood or iron placed between the sills of the building, or the heavy timber shoes or skids generally placed beneath the building, and the track of timbers on which it is to move, without being directly secured to either, the building being moved upon such rolls till its rear end passes off from the rear roll, when said roll is carried to the forward end of the building and placed in position in advance of the other rolls, and so on, as fast as a roll is left in the rear by the advance of the building, it must be carried forward and placed in a new position, all of which occasions a great deal of hard labor.

Again, if it is necessary to change the course of the building—as, for instance, such as turning the corner at the intersection of two streets—it becomes necessary to change the position of the rolls under the building, so that their axes shall all lie at right angles to the new course. This is not all done at once, but several changes are necessary to complete the change of course of the building to the extent of a right angle to its previous course. This has to be accomplished by repeated heavy blows of a sledge-hammer upon the sides of said rolls near their ends, while the load rests upon the middle of their lengths. This is a very laborious job, and besides it is a very difficult one to adjust the whole series of rolls so that their axes shall all be parallel to each other, so as to roll in the same direction and produce the desired movement of the building without undue strain or friction.

By the use of my improved rolls these objections are entirely overcome, and the labor of moving buildings and other heavy weights is greatly reduced.

The operation of my improved roll is as follows: If it is desired to move a building, the building is raised, and two or more heavy timbers are placed beneath its sills and secured thereto parallel to each other, and directly over a temporary track of timbers laid upon the ground in the usual manner. To the under side of the heavy timbers secured to the sills of the building are firmly bolted a suitable number of my improved rolls, the bolts passing through the holes $d\ d$ in the disk A, and screwed into the timber in a well-known manner. The rolls D are all set parallel to each other by rotating the disk B by means of the worm-shaft C. The building may now be moved as far as it is desired to move it in the same direction without further trouble about the rolls, and when it is desired to change the course each of the rolls may be rotated about a vertical axis any desired distance and set with its axis parallel to each of the other rolls previously changed by simply giving to the worm-shaft C a given number of revolutions in each case.

What I claim as new, and desire to secure by Letters Patent of the United States, is—

1. The combination of the fixed disk A, the disk B, adapted to revolve about a vertical axis and provided with teeth $f$, formed on its periphery, and carrying in suitable bearings the horizontal roll D, and the worm-shaft C, all arranged and adapted to operate substantially as and for the purposes described.

2. A roll for moving buildings and other heavy weights, mounted in bearings in a horizontal position on a plate or disk mounted upon and adapted to revolve about a vertical axis, and provided with worm or gear teeth on its periphery, in combination with a worm-shaft fitted to engage with said teeth, a fixed disk to which said rotary disk is secured, and one or more series of anti-friction rolls or balls adapted to roll in annular grooves formed in the contiguous faces of said disks, substantially as and for the purposes described.

Executed at Gloucester, Massachusetts, this 3d day of April, A. D. 1877.

WILLIAM ×BUSHEE.
his mark.

Witnesses:
H. C. HUBBARD,
STEPHEN A. McDONALD.